(12) United States Patent
Rash

(10) Patent No.: US 8,413,248 B2
(45) Date of Patent: Apr. 2, 2013

(54) METHOD FOR SECURE SINGLE-PACKET REMOTE AUTHORIZATION

(76) Inventor: Michael B. Rash, Gambrills, MD (US)

( * ) Notice: Subject to any disclaimer, the term of this patent is extended or adjusted under 35 U.S.C. 154(b) by 1471 days.

(21) Appl. No.: 11/726,518

(22) Filed: Mar. 22, 2007

(65) Prior Publication Data

US 2007/0234428 A1 Oct. 4, 2007

Related U.S. Application Data

(60) Provisional application No. 60/784,701, filed on Mar. 22, 2006.

(51) Int. Cl.
*H04L 29/06* (2006.01)
(52) U.S. Cl. .......................... 726/25; 709/223
(58) Field of Classification Search .............. 726/11–15, 726/25; 713/168–170
See application file for complete search history.

(56) References Cited

U.S. PATENT DOCUMENTS 7,594,268 B1 * 9/2009 Sobel ............................. 726/23
7,784,086 B2 * 8/2010 Perkins et al. ................. 726/3
2003/0145237 A1 * 7/2003 Chang et al. .................. 713/202
2005/0021727 A1 * 1/2005 Matsunami et al. ........... 709/223
2005/0132206 A1 * 6/2005 Palliyil et al. ................. 713/188

* cited by examiner

*Primary Examiner* — Eleni Shiferaw
*Assistant Examiner* — Phy Anh Vu
(74) *Attorney, Agent, or Firm* — Ober, Kaler, Grimes & Shriver; Royal W. Craig

(57) ABSTRACT

A method for secure single-packet remote authorization using a single packet authorization (SPA) server on a host system that passively monitors the network for connection attempts and anonymously accept or rejects said attempts depending on whether a valid SPA packet is detected, an SPA client on a client system that is responsible for generating the appropriately encrypted SPA packet in order to gain access to services on the host, and a particular packet format sent from the client to the host to gain access. The packet format is encrypted and non-replayable by virtue of 16 bytes of random data in every message, and an MD5 sum that is a hash function of the random data (made via any known hashing function). The SPA server stores the MD5 sum of every valid SPA packet that it monitors and flags any duplicate access attempts using the same MD5 hash as a previously monitored packet, in which case the SPA server treats the packet as being generated by a malicious attempt to replay the original packet.

17 Claims, 1 Drawing Sheet

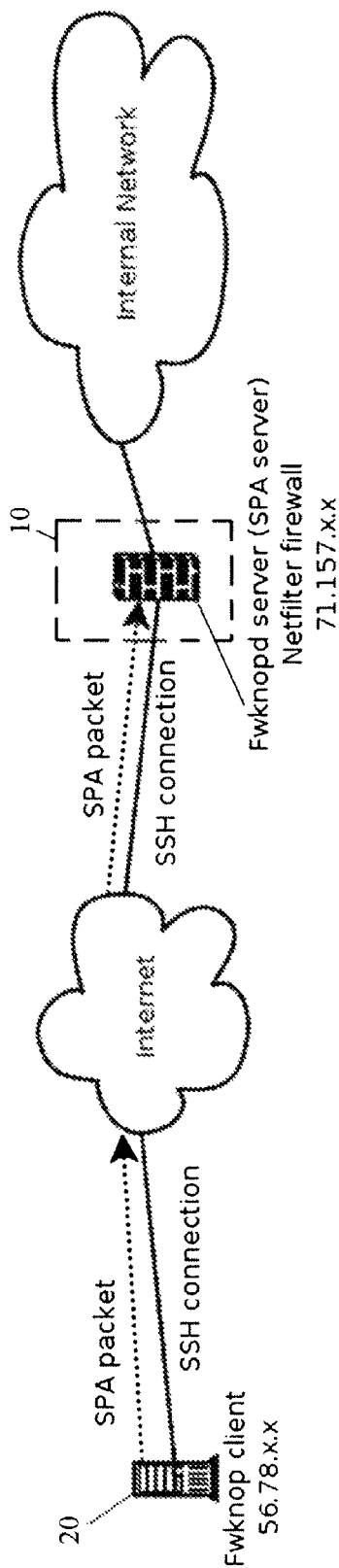

METHOD FOR SECURE SINGLE-PACKET REMOTE AUTHORIZATION

CROSS-REFERENCE TO RELATED APPLICATION(S)

The present application derives priority from U.S. Provisional Application No. 60/784,701 filed Mar. 22, 2006.

BACKGROUND OF THE INVENTION (1) Field of the Invention

The present invention relates to distributed information protection and network security and, more particularly, to a method for secure single-packet remote authorization using a daemon that passively monitors a network for a specially constructed encrypted packet and anonymously accepts or rejects subsequent connection attempts based on the characteristics of said packet.

(2) Description of Prior Art

Network technology is invaluable for sharing resources. However, connecting a computer or network to the Internet is a risky proposition. There is a high probability that eventually, someone will gain unauthorized access. To exploit a server-side application vulnerability, an intruder needs to gain access to an open port leading into the system, or trick the host system into opening one (through shellcode that exploits a software vulnerability and opens a backdoor into the system for example). This requires a combination of the host system's unique IP (Internet protocol) address, and the ability to talk to the server's TCP (Transmission Protocol) or UDP (User Datagram Protocol) stack and corresponding ports that serve as the door into the host system.

Firewalls help to prevent the ability of attackers to exploit software vulnerabilities through the use of port and protocol filtering to minimize server access from arbitrary IP addresses, and also through the use of NAT (network address translation) for protected internal hosts. Unfortunately, conventional firewalls operate under a fixed ruleset which, if predicted or examined through various scanning methods, can offer little protection for vulnerable services. Consequently, a variety of more robust authorization techniques have evolved to increase security.

For example, U.S. Patent Application Nos. 20050182968 and 20030140248 both by Izatt et al. show an "Intelligent firewall" that analyzes incoming packets to determine whether or not they are acceptable to forward on to a destination in the network. If the packet is not acceptable, access to the network is denied and the packet is dropped with no denial of access message being sent to the source of the packet. As a result, there is no detectable response to the sender of denied access from the firewall.

United States Patent Application 20050240994 by Burcham published Oct. 27, 2005 shows a method for maintaining network access and security that uses a perimeter client and a perimeter server.

"Port knocking" is a method of externally opening ports on a firewall by generating a connection attempt on a set of prespecified closed ports. Once a correct sequence of connection attempts is received the firewall rules are dynamically changed to allow the computer that sent the connection attempts to connect over specified port(s). Port knocking is typically implemented by a daemon (a computer program that runs in the background) that watches the firewall log file for connection attempts and that modifies the firewall configuration accordingly. The port knock sequence itself is a secret handshake comprising any number of TCP, UDP packets to numbered ports on the host system. The complexity of the knock can be anything from a simple ordered list of ports to a complex time-dependent, source-IP-based encrypted string. The portknock daemon listens for knocks on certain ports (either via the firewall log or by packet capture) and allows access accordingly. When the concept of port knocking was announced in 2003 (Krzywinski, M., Port Knocking: Network Authentication Across Closed Ports, SysAdmin Magazine 12: 12-17; 2003), many competing implementations were rapidly developed. There are now over 30 different software projects dedicated to various implementations of port knocking. The two most important characteristics of port knocking in terms of enhancing security are: 1) the passive communication of authentication information from a remote system to the host system, with no return of data (anyone who casually scans the target system will not be able to tell that there is any server listening on the ports protected by the knock server); and 2) the server side use of a packet filter to intercept all attempts to connect with the server that are not associated with a valid port knocking sequence. Consequently, even if an attacker possesses the host system's IP address, TCP and UDP ports that serve as the door to the host system are completely inaccessible without first issuing a valid knock sequence.

The present inventor has implemented an open-source daemon called fwknop (Firewall Knock Operator), which supports an entirely new mechanism for network authentication and authorization called Single Packet Authorization that requires only a single encrypted packet in order to gain access to protected services. This new mechanism offers many advantages over both shared and encrypted port knock sequences as discussed below.

Unfortunately, port knocking is not designed to provide bullet-proof security, and, indeed, replay attacks can easily be leveraged against a port knock server in an effort to masquerade as a legitimate client. Moreover, in port knocking schemes the communication of information within packet headers as opposed to the packet payload severely limits the amount of data that can effectively be transferred. The port fields of the TCP and UDP headers are 16 bits wide, so only two bytes of information can be transferred per packet in a traditional port knock sequence. This assumes that other fields within the packet header are not also made significant in terms of the knock sequence, but any conceivable implementation would not be able to transmit nearly as much information as a protocol that makes use of payload data. If only two bytes of information were all that were required to communicate the desired access to a portknock daemon then this would not be a significant issue, but it is not enough to simply create a mapping between a knock sequence (however short) and opening a port. An encryption algorithm can help, but even a symmetric block cipher with a reasonable key size of, say, 128 bits forces at least 8 packets to be sent at two bytes per packet. As soon as multiple packets become involved, we need to try to ensure that the packets arrive in order. This implies that a time delay is added between each successive packet in the knock sequence. Simply blasting the packets onto the network as quickly as possible might result in out of order delivery by the time the packets reach their intended target. Because the knock server is strictly passively monitoring packets and consequently has no notion of a packet acknowledgment scheme (such as built into the Transmission Control Protocol), a reasonable time delay is on the order of about a half second. Given a minimum of 8 packets to send, we are up to four seconds just to communicate the knock sequence. In addition, if there were ever a need to send more information, say on the order of 100 bytes, the time to send would be longer than most people would be willing to wait.

Unfortunately, under current port-knocking schemes, a consequence of sending multiple packets in a slow sequence is that it becomes trivial for an attacker to break any sequence as it is being sent by the port knocking client. All the attacker needs to do is to spoof a duplicate packet from the source address of the client as a knock while the sequence is in progress. This duplicate packet would be interpreted by the knock server as part of the sequence, and hence breaking the original sequence. There is existing software (programs like hping available at http://www.hping.org) that makes it exceedingly easy to spoof IP packets from arbitrary IP addresses.

It would be greatly advantageous to provide an authentication and authorization scheme employing Single Packet Authorization that does not suffer from this type of easy injection attack. It would also be advantageous to prevent attackers from replaying captured messages against the knock server. A mechanism should be in place that makes it easy for the server to know which messages have been sent before and not honor those that are duplicates of previous messages (it is not enough just to encrypt knock sequences as encryption can be deciphered as well).

There currently are no known traditional port knocking methods that elegantly prevent replay attacks, though some make it difficult (such as altering knock sequences based upon time, iterating a hashing function as in the S/KEY system, or even manually changing the agreed upon encryption key for each successful knock sequence). However, each of these known methods requires keeping state at both the client and the server, and does not scale well once lots of users become involved.

SUMMARY OF THE INVENTION

It is therefore, an object of this invention to provide a method for secure remote authorization using a single packet authorization (SPA) server on a host system, an SPA client on a client system, and a specially-formatted SPA packet sent from the client in order to gain access to services on the host.

It is another object to provide a method for secure remote authorization using a packet format that is encrypted and non-replayable.

It is another object to provide a method for secure remote authorization in which only a single packet needs to be sent (rather than continuous port-knocking), thereby minimizing the authorization footprint on the network.

It is still another object of the invention to provide a method for secure remote authorization using specially-formatted SPA packets that cannot be modified en-route, duplicated, or replayed by a malicious third party, thereby thwarting replay attacks.

These and other objects are accomplished herein by a method for secure single-packet remote authorization using a single packet authorization (SPA) server on a host system that passively monitors a network for a valid SPA packet while maintaining a default deny stance on a gateway packet filter, an SPA client on a client system that is responsible for generating the appropriately encrypted SPA packet in order to gain access to services on the host, and a particular packet format sent from the client to the host to gain access. The packet format is encrypted and non-replayable. This non-replayable Single Packet Authorization method facilitates a more elegant solution to the replay problem. Each SPA packet includes 16 bytes of random data in every message, and an MD5 sum that is a hash function of the random data (made via any known hashing function). The MD5 sum is calculated over the entire message and then used by the SPA server to verify message integrity after a successful message decrypt. The SPA server stores the MD5 sum of every valid SPA packet that it monitors and flags any duplicate access attempts. This way, if any SPA packet has the same MD5 hash as a previously monitored packet, then the SPA server treats the packet as being generated by a malicious attempt to replay the original packet against the server in an effort to gain the same access.

The present method of network authorization protects arbitrary network services by first requiring that a packet filter intercepts and blocks all access to a set of protected services (this interception typically happens within the OS kernel, and hence code paths available to a would-be attacker are minimized). The packet filter is dynamically reconfigured after passively monitoring a valid SPA packet. The method is described and exemplified in the context of an open source project called "fwknop" (which includes both client and server-side components). The SPA authentication packets are logged via the Netfilter ulogd pcap writer or by sniffing the wire via libpcap, and are encrypted. This technique has several advantages over the current port-knocking methods of network authentication since only single packets are required, much larger messages can be sent (up to the minimum MTU between the client and server), sequences cannot be busted by a malicious third party, and replay attacks are easily thwarted.

Other variations and advantages are described in the detailed description below.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 1 shows a basic network diagram of the present system.

FIG. 2 illustrates the Single Packet Authorization Message Format.

DETAILED DESCRIPTION OF THE PREFERRED EMBODIMENTS

The present invention is a method for secure single-packet remote authorization using a single packet authorization (SPA) server on a host system that passively monitors a network for connection attempts and anonymously accept or rejects said attempts, an SPA client on a client system that is responsible for generating the appropriately encrypted SPA packet in order to gain access to services on the host, and a particular packet format sent from the client to the host to gain access. The packet format is encrypted with either a symmetric or asymmetric encryption algorithm, and non-replayable by virtue of comparison of MD5 hash values of previously communicated SPA packets. The SPA client and SPA server are components of a firewall knock operator, and are preferably existing software components herein identified as fwknop ("FireWall Knock Operator"), which is programmed to implement the present method. However, one skilled in the art should understand that other existing firewall knock operators may be programmable in a like manner to serve equally well. There are two major components to fwknop: an authenticating Ethernet sniffer (fwknopd server) on the host system that is responsible for modifying a packet filter that has been configured in a default-drop stance for all protected services, and an SPA client (fwknop client) on the client system that is responsible for generating the appropriately encrypted SPA packet in order to gain access to services protected by fwknopd.

FIG. 1 shows a basic network diagram of the present system. The fwknopd SPA server 10 is programmed to allow access to a specified port by a specified username once a valid SPA message is monitored. The fwknopd server 10 is also programmed to accept each valid SPA message only once (hence "non-repeatability"). Thus, in order for an fwknop SPA client 20 to authenticate and allow the subsequent authorization criteria to be applied, several pieces of information must be securely communicated to the fwknopd SPA server 10 through an intermediate network. Thus, the present method requires a specific Fwknop Single Packet Authorization Message Format (described below). Several other software components are also required. Specifically, the method requires an existing firewall on the server 10 side (this technique is compatible with any commercial or non-commercial firewall or packet filtering architecture), as well as a packet capture library such as libpcap. Netfilter is an existing open-source packet filtering framework inside the Linux kernel series which enables packet filtering, network address and port translation and other packet manipulation, and the fwknop implementation currently supports Netfilter. Netfilter comprises a set of hooks inside the Linux kernel that allows kernel modules to register callback functions with the network stack. A registered callback function is then called back for every packet that traverses the respective hook within the network stack. Libpcap is a library of code that provides a high level interface to allow packet capture. Generally, libpcap implements a virtual device from which captured packets are read from userspace applications. This allows a packet filtering mechanism for use as a network traffic analyzer.

The present system employs Netfilter to intercept (hook) packets within the kernel, which are then analyzed and screened using libpcap. Thus, anyone scanning for a service protected by this method cannot even talk directly to the IP stack without being authorized. In accordance with the present invention, Netfilter is set to maintain a "default drop" stance in order to protect services (such as OpenSSH) with an additional layer of security, thereby making the exploitation of vulnerabilities much more difficult. The fwknop server 10 passively monitors authorization packets via libcap and hence there is no "server" to which to connect in the traditional sense. Access to a protected service is only granted after a valid encrypted and non-replayed packet is monitored.

On the client 20 side, fwknop is used to generate encrypted and non-replayable IP packets that will be authenticated (both symmetric and asymmetric encryption algorithms are supported) and tested for authorization (by comparison of username and cryptographically strong signatures against required Access Control Lists) in order to gain access through a packet filter to a protected service. In order for an fwknop SPA client 20 to authenticate and allow the subsequent authorization criteria to be applied, several pieces of information must be securely communicated to the fwknopd SPA server 10. Thus, the present method requires a specific Fwknop Single Packet Authorization Message Format by which a client transmits the following within each SPA message:

16 bytes of random data
local username
local timestamp
fwknop version
mode (access or command)
desired access (or command string)
MD5 sum FIG. 2 illustrates the Single Packet Authorization Message Format.

The 16 bytes of random data ensures that each SPA message has a extremely high probability of being unique and hence allows the fwknopd server to maintain a cache of previously seen messages in order to thwart replay attacks.

The local username enables the fwknop server to distinguish between individual users so that different levels of access can be granted on a per username basis.

The version number allows the fwknop message format to be extended while preserving backwards compatibility for older versions of the software.

The mode value instructs the server that the client either wishes to gain access to a service or run a command, each of which is specified in the next field.

The MD5 sum is calculated over the entire message and then used by the server 10 to verify message integrity after a successful message decrypt.

Each of the above values are concatenated together with ":" characters (with base64 encoding applied where necessary so as to not bust the field separation convention) and then the entire message is encrypted, either by symmetric or asymmetric encryption schemes (preferably Rijndael or GnuPG respectively). The ciphering requires sharing of a key up to 128 bits (symmetric) or 2048 bytes (asymmetric) in length between the fwknop SPA client and the fwknopd SPA server.

To further illustrate the foregoing method, a practical example will be explained to illustrate the usage of fwknop in the default Single Packet Authorization mode to protect and gain access. First, it is necessary to configure the fwknop server 10 to allow access to, for example, TCP port 22 by, for example, the "mbr" username. This entails the definition of an fwknopd server configuration file. In the present example both symmetric and asymmetric encryption schemes (Rijndael and GnuPG respectively) will be shown, and so configuration directives that enable an fwknop client to utilize either encryption scheme. The fwknop access configuration file "access.conf" for present purposes is shown below.

SOURCE: ANY;
DATA_COLLECT_MODE: PCAP;
OPEN_PORTS: tcp/22;
PERMIT_CLIENT_PORTS: Y;
KEY: demokey1;
GPG_HOME_DIR: /root/.gnupg;
GPG_DECRYPT_ID: 706FBFDD;
GPG_DECRYPT_PW: decryptgpgpw;
GPG_REMOTE_ID: A742839F;
FW_ACCESS_TIMEOUT: 10;
REQUIRE_USERNAME: mbr;

Normally, this file is placed at the location /etc/fwknop/access.conf in the filesystem on the host system where fwknopd runs. The SOURCE variable describes the IP addresses and/or networks from which SPA packets may be issued (the "ANY" value is a wildcard that allows an SPA packet to be generated from any IP or network). The DATA_COLLECT_MODE variable informs fwknopd that SPA packets are to be collected via libpcap by sniffing the wire directly instead of monitoring a file that is written to by a separate sniffer process or by the Netfilter ulogd pcap writer.

The OPEN_PORTS variable defines which specific ports will be opened in the Netfilter policy after receiving a valid SPA packet. The PERMIT_CLIENT_PORTS variable instructs the fwknopd server to open all TCP and/or UDP ports that are specified by the client in the (encrypted) SPA packet. The KEY variable is most important for the symmetric Rijndael encryption algorithm since it defines the shared key between the fwknop client and fwknopd server. On the client side, the user is prompted to enter the shared key before the SPA packet is encrypted and sent on the wire. All variables that begin with "GPG_" describe some aspect of using GnuPG (see: http://www.gnupg.org) as the encryption mechanism for SPA communications. The GPG_HOME_DIR variable defines the filesystem path to the GnuPG directory where the fwknop server key is stored. The GPG_DECRYPT_ID variable defines the key ID of the server public key that will be used by the fwknop client 20, and the GPG_DECRYPT_PW variable defines the password associated with the server key (the fwknopd process must be able to decrypt SPA packets on the fly as they are sniffed off the wire). The GPG_REMOTE_ID defines the key ID of the client key that must be used to cryptographically sign the SPA message. Note that GnuPG keys must be generated on both the client and server side for the SPA communication, and each of these keys must be imported (and signed) into the key ring on the opposite side (i.e. server to client and vice versa).

The FW_ACCESS_TIMEOUT variable specifies how long the packet filter will be configured to allow the IP address specified within the SPA packet to access the desired services. Finally, the REQUIRE_USERNAME variable describes the username that must: be executing the fwknop client process on the client operating system (note that this is not cryptographically strong, but it is an additional layer of security). One important note is that while the FW_ACCESS_TIMEOUT variable is used to define the amount of time (in seconds) that the packet filter controlled by fwknopd will allow connections to be established with a protected service, the removal of the rule in the packet filter that grants access to the service does not necessarily remove all access. The packet filter may employ a connection tracking mechanism that will allow all packets associated with any TCP session that is established during the access window defined by the FW_ACCESS_TIMEOUT value to continue even after the window is passed. This is an advantage because communication over long running protocols (such as SSH for example) can be maintained, but all other attempts to establish a TCP session with the protected service will fail unless a valid SPA packet is monitored by fwknopd.

The following example command executions illustrate the Single Packet Authorization scheme according to the present invention in operation from both the client 20 and host perspectives. Because fwknop currently supports the Netfilter firewalling architecture in the Linux kernel, all command output below is collected from Linux systems, but the technique is equally applicable to other firewall architectures such as Check Point FW-1, NetScreen, and Cisco PIX. Note that at the beginning of each command, there is either the string "client" or "server". These strings are included in order to inform the reader about where the command is being executed (either on the client system 20 to generate the SPA packet, or on the server system 10 to monitor how the packet filter policy is modified, etc.).

First, we login to the host system and start fwknopd SPA server by using the standard initialization script (requires root access):

```
[server]# /etc/init.d/fwknop start
* Starting fwknop ... [ ok ]
```

Now, we look at the messages that are written to syslog by fwknopd in order to verify that everything is functioning correctly and fwknopd is ready to accept SPA packets:

```
# tail -n 20 /var/log/messages | grep fwknopd
Jan 24 18:47:50 server fwknopd: starting fwknopd
Jan 24 18:47:50 server fwknopd: flushing existing
Netfilter
IPT_AUTO_CHAIN chains
Jan 24 18:47:50 server fwknopd: imported p0f-based
passive OS
fingerprinting signatures
Jan 24 18:47:51 server fwknopd: imported port
knocking access
directives (1 SOURCE definitions).
Jan 24 18:47:51 server fwknopd: imported previous
md5 sums from disk
cache: /var/log/fwknop/md5sums
```

The packet filter (Netfilter in our case) on the host system has not yet been configured in default-drop mode (to block all SSH connections), so we do that now, and also add a state rule to allow established TCP connections to remain active:

```
# iptables -I INPUT 1 -p tcp --dport 22 -j DROP
# iptables -I INPUT 1 -p tcp -m state --state
ESATABLISHED,RELATED -j
ACCEPT
```

Next, on the client 20 side, it can be demonstrated using existing software such as Nmap that there is no prior access to any SSH server on the fwknopd firewall (there should only be access after sending a proper SPA packet). Nmap ("Network Mapper") is a free open source utility for network exploration or security auditing. Nmap uses raw IP packets to determine what hosts are available on the network, what services (application name and version) those hosts are offering, what operating systems (and OS versions) they are running, what type of packet filters/firewalls are in use, and other characteristics. In the following Nmap output, we clearly see that the sshd port, TCP port 22, is "filtered" which means Nmap could not tell if it is open or closed.

```
[client]# nmap -P0 -p 22 server
Starting nmap 3.83.DC13 (
http://www.insecure.org/nmap/ ) at 2006-01-24
18:50 EST
Interesting ports on server (10.10.10.1):
PORT STATE SERVICE
22/tcp filtered ssh
Nmap finished: 1 IP address (1 host up) scanned in
2.100 seconds
```

This indicates that indeed the packet filter has been properly configured to disallow all access to sshd since not even a TCP connection can be established. At this point, the packet filter on the server 10 is properly configured (there is no access from the client 20 system), and fwknopd is running and sniffing the connection for SPA packets. We are ready to now generate the SPA packet against the fwknopd server in an effort to gain access to sshd.

To generate a packet pursuant to the Single Packet Authorization Message Format of the present invention, we startup the fwknop client first in, for example, symmetric encryption mode. The user will be prompted for an encryption key, and must type in the same key that is listed in the KEY variable in the fwknopd access.conf file described above. The dialog for this is as follows:

```
[client]$ fwknop -A tcp/22 -s -k server
[+] Starting fwknop in client mode.
[+] Resolving hostname: server
[+] Enter an encryption key. This key must match a
key in the file
/etc/fwknop/access.conf on the remote system.
Encryption Key:
[+] Building encrypted single-packet authorization
(SPA) message...
[+] Packet fields:
Random data: 7770617500218631
Username: mbr
Timestamp: 1138147120
Version: 0.9.6
Action: 1 (access mode)
Access: 0.0.0.0,tcp/22
MD5 sum: 1uUNjtZ042VPkFZ76HW+NA
[+] Sending 128 byte message to 10.10.10.1 over
udp/62201...
```

Next, to attempt to establish an SSH connection and successfully login, we type the "hostname" command to show that we actually logged into the server system:

```
[client]$ ssh server
Password:
Last login: Tue Jan 20 18:47:37 2006 from client
[server]$ hostname
server
```

Recall that the access.conf file on the fwknopd server 10 was configured to remove the packet filter access after ten seconds. This implies that if we Nmap-analyze the server 10 again from the client 20 after waiting 10 seconds we should not be able to detect that sshd is even listening (this can be done from a separate window on the client system so as to leave the existing SSH session intact). The Nmap output is as follows:

```
[client]# nmap -P0 -p 22 server
Starting nmap 3.83.DC13 (
http://www.insecure.org/nmap/ ) at 2006-01-24
18:55 EST
Interesting ports on server (10.10.10.1):
PORT STATE SERVICE
22/tcp filtered ssh
Nmap finished: 1 IP address (1 host up) scanned in
2.100 seconds
```

Note that the original session is still active because Netfilter is allowing packets that are part of the original established session through:

```
[server]$ hostname
server
```

Thus, in the fwknopd server logfile we see the following messages have been generated as a result of receiving the valid SPA packet (note the timestamps which indicate that the firewall ACCEPT rule was indeed removed after 10 seconds):

```
Jan 24 19:14:56 server fwknopd: received valid
Rijndael encrypted
packet from: 192.168.20.2, remote user: mbr
Jan 24 19:14:56 server fwknopd: adding
FWKNOP_INPUT ACCEPT rule for 192.168.20.2 ->
tcp/22 (10 seconds)
Jan 24 19:15:07 server knoptm: removed iptables
FWKNOP_INPUT ACCEPT rule for 192.168.20.2 ->
tcp/22, 10 second timeout exceeded
```

In the log messages above, "FWKNOP_INPUT" refers to the custom Netfilter chain that is built by fwknopd as it runs. All dynamically created rules (with the exception of a jump rule in the Netfilter INPUT chain) are added and deleted from this chain so as to always keep fwknopd rules separate from the existing Netfilter policy.

At this point we can be confident that the fwknop software is both generating SPA messages, encrypting/decrypting them via the symmetric Rijndael algorithm, monitoring them as they traverse the network, and modifying firewall rules to grant access to the desired service for a limited window of time.

The following example reflects the identical scenario, except that this time GnuPG is used to asymmetrically encrypt and decrypt the SPA packet using public/private keys.

First we verify with Nmap that we still have no ability to access sshd on the server system (assuming fwknopd removed the ACCEPT rule from the previous example):

```
[client]# nmap -P0 -p 22 server
Starting nmap 3.83.DC13 (
http://www.insecure.org/nmap/ ) at 2006-01-24
19:03 EST
Interesting ports on server (10.10.10.1):
PORT STATE SERVICE
22/tcp filtered ssh
Nmap finished: 1 IP address (1 host up) scanned in
2.800 seconds
```

With no access to sshd, we now use fwknop in GnuPG mode. The SPA packet is encrypted with the public key identified by the GPG_DECRYPT_ID variable in access.conf on the server, and cryptographically signed by the key identified by the GPG_REMOTE_ID variable:

```
[client]$ fwknop -A tcp/22 --gpg-recip 706FBFDD --
gpg-sign A742839F -s -k server
[+] Starting fwknop in client mode.
[+] Resolving hostname: server
[+] Enter the GPG password for signing key:
A742839F
GPG signing password:
[+] Building encrypted single-packet authorization
(SPA) message...
[+] Packet fields:
Random data: 2360737983054140
Username: mbr
Timestamp: 1138154925
Version: 0.9.6
Action: 1 (access mode)
Access: 0.0.0.0,tcp/22
```

```
MD5 sum: ZK0yoVWEjLxwE1ioh/bC3g
[+] Sending 999 byte message to 10.10.10.1 over
udp/62201...
```

An observation should be made about the output above: the packet size of GnuPG SPA packet is 999 bytes (in bold) whereas the packet size for the Rijndael SPA packet was only 128 bytes. The difference is due to the manner in which the respective encryption algorithms work. The former is encrypted with an asymmetric algorithm that utilizes a 2048-bit key size (this was the size of the keys chosen via the "gpg --gen-key" command), whereas the later is symmetrically encrypted with a block cipher that uses a 16-byte key and operates on 128 byte data blocks. Despite the resulting difference in the SPA packet size, the essential fact remains that even the largest SPA packet (assuming a GnuPG key size less than or equal to 2048 bits) fits within the Maximum Transmission Unit (MTU) of Ethernet networks (1500 bytes) and many other wide area networking data link layer protocols. This allows all required data to be transmitted within a single encrypted packet without having to be fragmented en-route because of intermediate networks with smaller MTU sizes.

After generating the SPA packet, we have access to sshd running on the server 10.

```
[client]$ ssh server
Password:
Last login: Tue Jan 24 19:15:01 2006 from client
[server]$ hostname
server
```

Once again, the following messages are written to syslog by fwknopd indicating that ssh access is permitted for 10 seconds and then removed:

```
Jan 24 21:10:09 server fwknopd: received valid GPG
encrypted packet
(signed with required key ID: A742839F) from:
192.168.20.2, remote
user: mbr
Jan 24 21:10:09 server fwknopd: adding FWKNOP_INPUT
ACCEPT rule for
192.168.20.2 -> tcp/22 (10 seconds)
Jan 24 21:10:20 server knoptm: removed iptables
FWKNOP_INPUT ACCEPT
rule for 192.168.20.2 -> tcp/22, 10 second timeout
exceeded
```

One final example illustrates one of the most important features of the fwknop implementation of Single Packet Authorization: non-replayability. The manner in which fwknop constructs an SPA packet includes several fields (listed in the output of the fwknop client), and as seen in FIG. 2 one of these fields contains 16 bytes of random data generated, for example, by the pseudo random number generator built into the Linux kernel. This data is generated for each SPA packet, and is almost always guaranteed to be different (subject to the limitations of the pseudo random number generator) from one fwknop execution to the next. Hence, after the SPA cleartext data is encrypted, the resulting encrypted data is also guaranteed to be unique. The fwknopd server 10 uses this fact to store an MD5 hash of every valid SPA packet that it monitors. This way, if any SPA packet has the same MD5 hash as a previously monitored packet, then the fwknopd server treats the packet as being generated by a malicious attempt to replay the original packet against the server in an effort to gain the same access.

To illustrate how the fwknopd server 10 detects and thwarts such an attack, we Nmap the server one more time to make sure that we currently do not have ssh access:

```
[client]# nmap -P0 -p 22 server
Starting nmap 3.83.DC13 (
http://www.insecure.org/nmap/ ) at 2006-01-24
19:45 EST
Interesting ports on server (10.10.10.1):
PORT STATE SERVICE
22/tcp filtered ssh
Nmap finished: 1 IP address (1 host up) scanned in
2.600 seconds
```

We indeed have no access to TCP port 22 on the server, so now we execute the fwknop client 20 with the -v command line switch to put fwknop into verbose mode:

```
[client]$ fwknop -A tcp/22 -v -s -k server
[+] Starting fwknop in client mode.
[+] Resolving hostname: server
[+] Enter an encryption key. This key must match a
key in the file
/etc/fwknop/access.conf on the remote system.
Encryption Key:
[+] Building encrypted single-packet authorization
(SPA) message...
[+] Packet fields:
Random data: 4955926838601951
Username: mbr
Timestamp: 1138163068
Version: 0.9.6
Action: 1 (access mode)
Access: 0.0.0.0,tcp/22
MD5 sum: 0hSxA4xX1iGLSuUbcJ9Z5w
[+] Packet data:
0QSgOBkbV9AtbK8s7KaZPS9B/6waY7e3aoM7Yhjrq1m6c0Tzze
JwCre/qGOPwIJCbs9GQvh
GF/9G8fXmsz3LX5xAXFQrVf+YXBJWey6q5VJsnTWAdrQHXRVPA
EIZ7UvE
[+] Sending 128 byte message to 10.10.10.1 over
udp/62201...
```

We should have ssh access at this point, and so we test this:

```
[client]$ ssh server
Password:
Last login: Tue Jan 24 21:10:15 2006 from client
[server]$ hostname
server
```

Now, we examine the output of the fwknop command above, and resend the packet over the network with netcat:

```
[client]$ echo
"0QSgOBkbV9AtbK8s7KaZPS9B/6waY7e3aoM7Yhjrq1m6c0Tzz
eJwCre/qgOPwIJCbs9GQhGF/9G8fXmsz3LX5xAXFQrVf+YXBJW
ey6q5VJsnTWAdrQHXRVPAEIZ7UvE" | nc -u
server 62201
```

On the server 10, we see the following log message, and no access is granted to the would-be SPA client:

```
Jan 24 21:11:18 client fwknopd: attempted message
replay from:
192.168.20.2
```

It should now be apparent that it is possible to demonstrate the core functionality provided by Single Packet Authorization (SPA) by implementing it into fwknop. In retrospect, the core functionality of the present method is derived from three primary improvements:

1) Setting the default deny stance in a packet filter on all packets attempting to communicate with a protected service and allowing access only to proper SPA packets;

2) The specially constructed encrypted and non-replayable replayable packet format, and dynamic reconfiguration of the packet filter to allow temporary access to an IP address (one time only);

3) The encrypted packet is passively monitored off the wire using the standard libpcap library commonly used in Intrusion Detection Systems.

One skilled in the art should understand that there are some features offered by fwknop that have not been explicitly demonstrated above, such as SPA packet spoofing, auto-resolution of external NAT address via external website, OpenSSH integration patch, and more. The basic functionality may be embellished to additionally incorporate any of the foregoing capabilities as well.

In all such cases it should be apparent that there is passive communication of authentication information from the client system to the host system, with no return of data, and so anyone scanning the target system cannot tell that there is anything listening on the ports protected by the knock server. Moreover, the server side use of a packet filter intercepts all attempts to connect with the server that are not associated with a valid port knocking sequence. Consequently, even if an attacker possesses the host system's IP address, TCPs and UDP ports that serve as the door to the host system, it is all useless since a connection cannot even be established without first issuing a valid SPA packet. Finally, the non-replayable format of the particular SPA message disclosed herein provides the most robust security currently available.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

What is claimed is:

1. A method for secure remote authorization using a single packet authorization (SPA) server on a host system, a SPA client on a client system, and a formatted SPA packet sent from the SPA client in order to gain access to services on the host system, comprising the steps of:
   constructing by said SPA client a formatted SPA packet having a payload of access code comprising a plurality of bytes of random data;
   sending said formatted SPA packet to said SPA server, said SPA server configured to allow access to certain services on said host system upon receipt of a formatted packet containing a payload of predetermined access code, and to maintain a log file of hash values of all formatted SPA packets received from SPA clients allowed access to said host system services;
   said SPA server receiving said sent formatted SPA packet and performing the substeps of:
      comparing a hash value of said sent SPA packet with the hash values in said log file;
      determining whether the payload of said sent formatted SPA packet contains said predetermined access code; and
      allowing access to said services on said host system only when said sent formatted SPA packet payload contains said predetermined access code and said hash value of said sent formatted SPA packet does not match any previously stored hash values; and after allowing said access, said SPA server storing the hash function value of said sent formatted SPA packet in said log file.

2. The method for secure remote authorization according to claim 1, wherein said SPA packet format is encrypted and non-replayable.

3. The method for secure remote authorization according to claim 2, wherein said SPA packet format comprises a plurality of bytes of random data and a hash value generated from the random data.

4. The method for secure remote authorization according to claim 3, wherein said SPA packet format comprises 16 bytes of random data.

5. The method for secure remote authorization according to claim 4, wherein said hash value of the random data is generated by application of an MD5 digest function.

6. The method for secure remote authorization according to claim 1, wherein said hash value said sent formatted SPA packet is generated by application of an MD5 digest function calculated over the entire formatted SPA packet.

7. The method for secure remote authorization according to claim 6, wherein said SPA server stores log file contains an MD5 sum of the MD5 digest function for every valid formatted SPA packet that it monitors to prevent duplicate access attempts.

8. The method for secure remote authorization according to claim 6, wherein if said SPA server detects a formatted SPA packet having a hash value duplicating a hash value in said log file it treats said packet as a malicious access attempt.

9. The method for secure remote authorization according to claim 8, wherein said SPA client dynamically generates each valid formatted SPA packet to be uniquely identifiable.

10. A system for secure single-packet remote authorization to gain access to services on a network, comprising:
   an SPA client on a client system in communication with said network generates SPA packets according to a predetermined format;
   a single packet authorization (SPA) server in communication with said network passively monitors said network for a valid SPA packet having said predetermined format while maintaining a gateway packet filter in a default deny state;
   an encrypted and non-replayable SPA packet generated by said SPA client according to said predetermined format and communicated to said server via said network, said SPA packet comprising a plurality of bytes of random data;
   a storage in communication with said server, said storage maintaining a record of hash values of each previously received valid SPA packet
   wherein said server compares a hash value of said encrypted and non-replayable SPA packet with said record of the hash values of each previously received valid SPA packet to identify replayed packets and wherein authorization to access services on the network is denied to said client system.

11. The system for secure single-packet remote authorization according to claim 10, wherein said SPA packet format further comprises a hash value of the random data.

12. The system for secure single-packet remote authorization according to claim 11, wherein said SPA packet format comprises 16 bytes of random data.

13. The system for secure single-packet remote authorization according to claim 12, wherein said hash value of the random data comprises a result of an MD5 digest function computed over said random data.

14. The system for secure single-packet remote authorization according to claim 11, wherein if said SPA server detects a duplicate SPA packet it treats said packet as a malicious access attempt.

15. The system for secure single-packet remote authorization according to claim 11, wherein said SPA client dynamically generates each valid SPA packet to be uniquely identifiable.

16. The system for secure single-packet remote authorization according to claim 10, wherein said hash function value of the random data said encrypted and non-replayable SPA packet comprises an MD5 digest function calculated over the entire SPA packet.

17. The system for secure single-packet remote authorization according to claim 16, wherein said SPA server stores an MD5 sum of the MD5 digest function for every valid SPA packet that it monitors to prevent duplicate access attempts.

* * * * *